G. B. POLEN.
PRINTERS' QUOIN.

No. 173,493. Patented Feb. 15, 1876.

Witnesses:
Theodore Mungen
Geo. H. Howard

Inventor:
George B. Polen
By M. Burris
Attorney

UNITED STATES PATENT OFFICE.

GEORGE B. POLEN, OF PHILADELPHIA, PENNSYLVANIA.

IMPROVEMENT IN PRINTERS' QUOINS.

Specification forming part of Letters Patent No. 173,493, dated February 15, 1876; application filed November 16, 1875.

*To all whom it may concern:*

Be it known that I, GEORGE B. POLEN, of the city of Philadelphia, in the county of Philadelphia and State of Pennsylvania, have invented certain new and useful Improvements in Quoins for Locking Printers' Forms; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
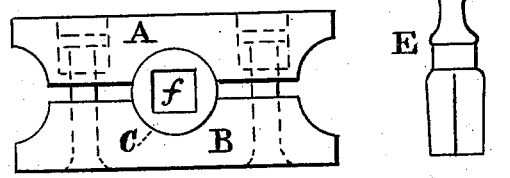
Figure 2:
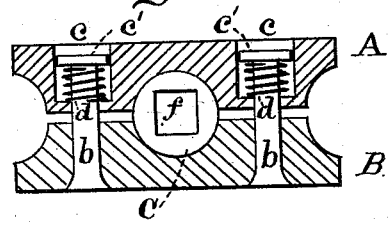
Figure 3:
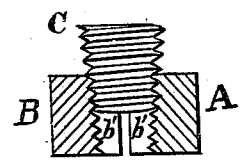

Figure 1 is a top view. Fig. 2 is a sectional view, showing the connecting-bolts and spiral springs and recesses in the plates. Fig. 3 is a transverse section, showing the tapering screw partly in the female screws in the plates.

My invention relates to quoins for locking up printers' forms; and consists of a tapering screw in tapering female screws through the inner sides of two plates, adjustable laterally, as hereinafter more fully described.

A B are the adjustable plates, having tapering female screws $b'$ through their inner sides, to receive the tapering screw C, as shown in the drawings. The top end of the screw C is provided with a square hole, $f$, to receive the end of a key, E, by which the screw is operated. The plates are connected by bolts $b\,b$, extending through the plates, and fixed at one end in plate B, and having flat heads $C'$, forming square shoulders at the other ends, to hold the spiral springs $d$, arranged on the bolts, in the recesses $c$ in plate A, as shown in Fig. 2 of the drawings.

The tapering screw being unscrewed, the plates are held together by the spiral springs, having their bearings against the inner sides of the flat heads of the bolts, and the shoulders at the bottom of the recesses in plate A; and, in this closed form, the quoin is placed, like an ordinary wedge-quoin, between the "chase" and the "side-stick," and, with the key in the square hole $f$, the tapering screw is screwed downward, moving the plates laterally in opposite directions, and thus locking up the form.

The plates may be connected by any other well-known suitable devices, instead of the bolts.

What I claim as new, and desire to secure by Letters Patent, is—

1. A printer's quoin of two adjustable plates, A B, having tapering female screws $b'$, in combination with a tapering screw, C, substantially as and for the purposes described.

2. A printer's quoin of two adjustable plates, A B, connected by bolts $b\,b$, and having tapering female screws $b'$ and recesses $c$, in combination with tapering screw C and spiral springs $d$, substantially as and for the purposes described.

In testimony that I claim the foregoing as my own invention I affix my signature in presence of two witnesses.

GEORGE B. POLEN.

Witnesses:
GEO. ARMSTRONG,
WALTER H. LUFF.